US008726358B2

(12) United States Patent
Rouskov et al.

(10) Patent No.: US 8,726,358 B2
(45) Date of Patent: May 13, 2014

(54) IDENTITY OWNERSHIP MIGRATION

(75) Inventors: Yordan I. Rouskov, Kirkland, WA (US); Tore Sundelin, Duvall, WA (US); Mrigankka Fotedar, Redmond, WA (US); Sarah Faulkner, Seattle, WA (US); Pui-Yin Winfred Wong, Redmond, WA (US); Wei-Quiang Michael Guo, Bellevue, WA (US); Lynn Ayres, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 12/102,541

(22) Filed: Apr. 14, 2008

(65) Prior Publication Data

US 2009/0260072 A1 Oct. 15, 2009

(51) Int. Cl.
*G06F 7/04* (2006.01)
*G06F 15/16* (2006.01)
*G06F 17/30* (2006.01)
*H04L 29/06* (2006.01)
*G06F 21/00* (2013.01)

(52) U.S. Cl.
USPC ............................... 726/8; 713/185; 707/784

(58) Field of Classification Search
USPC ........................................................... 726/8
See application file for complete search history.

(56) References Cited

U.S. PATENT DOCUMENTS

| 5,908,469 | A  | * | 6/1999  | Botz et al. ........................... 726/4 |
| 6,141,778 | A  | * | 10/2000 | Kane et al. ......................... 726/4 |
| 6,269,405 | B1 | * | 7/2001  | Dutcher et al. ................. 709/248 |
| 7,222,362 | B1 |   | 5/2007  | Canetti |
| 7,296,290 | B2 | * | 11/2007 | Barriga et al. ..................... 726/8 |
| 7,324,972 | B1 | * | 1/2008  | Oliver et al. ..................... 705/40 |
| 7,367,044 | B2 | * | 4/2008  | Fowler et al. ..................... 726/1 |
| 7,428,750 | B1 | * | 9/2008  | Dunn et al. ....................... 726/8 |
| 7,454,623 | B2 | * | 11/2008 | Hardt ............................ 713/182 |
| 7,562,382 | B2 | * | 7/2009  | Hinton et al. ..................... 726/2 |
| 7,600,253 | B1 | * | 10/2009 | Wang ............................. 726/10 |
| 7,607,008 | B2 | * | 10/2009 | Howard et al. ................. 713/155 |
| 7,631,346 | B2 | * | 12/2009 | Hinton et al. ..................... 726/8 |
| 7,657,639 | B2 | * | 2/2010  | Hinton .......................... 709/229 |
| 7,665,127 | B1 | * | 2/2010  | Rao et al. ......................... 726/9 |
| 7,784,092 | B2 | * | 8/2010  | Pearson et al. .................... 726/8 |
| 7,793,342 | B1 | * | 9/2010  | Ebrahimi et al. ................. 726/8 |
| 7,849,204 | B2 | * | 12/2010 | Yared et al. .................... 709/229 |
| 8,131,763 | B2 | * | 3/2012  | Tuscano et al. ............... 707/783 |
| 8,281,372 | B1 | * | 10/2012 | Vidal ............................... 726/5 |

(Continued)

OTHER PUBLICATIONS

IEEE Computer Society, "Managing Multiple and Dependable Identities", Nov.-Dec. 2003; http://seclab.dti.unimi.it/Papers/w6sam.lo.pdf.

(Continued)

*Primary Examiner* — Carolyn B Kosowski
(74) *Attorney, Agent, or Firm* — Bryan Webster; Raghu Chinagudabha; Micky Minhas

(57) ABSTRACT

Systems, computer-implemented methods, and computer-readable media for establishing an online account with a resource provider are provided. An authentication token including identification of a user from an authentication server is received. The identification of the user from the authentication token is utilized to establish an online account for the user with the resource provider. Additional credentialing information from the user for the online account is received. The additional information received from the user is associated with the online account for the user with the resource provider.

20 Claims, 6 Drawing Sheets

(56) References Cited

U.S. PATENT DOCUMENTS

| | | |
|---|---|---|
| 2002/0103999 A1 | 8/2002 | Camnisch |
| 2003/0037233 A1* | 2/2003 | Pearson ............... 713/156 |
| 2003/0115267 A1* | 6/2003 | Hinton et al. ............ 709/204 |
| 2003/0149781 A1 | 8/2003 | Yared |
| 2005/0021975 A1* | 1/2005 | Liu ..................... 713/182 |
| 2005/0204148 A1* | 9/2005 | Mayo et al. ............ 713/185 |
| 2005/0261995 A1* | 11/2005 | Phelan ................. 705/31 |
| 2006/0080730 A1 | 4/2006 | Cahill |
| 2006/0095958 A1 | 5/2006 | Lehinger |
| 2006/0129816 A1* | 6/2006 | Hinton ................. 713/169 |
| 2006/0129817 A1 | 6/2006 | Borneman |
| 2006/0174335 A1* | 8/2006 | Jorgenson ............. 726/10 |
| 2006/0259776 A1 | 11/2006 | Johnson |
| 2006/0294196 A1* | 12/2006 | Feirouz et al. ........... 709/217 |
| 2007/0143829 A1 | 6/2007 | Hinton |
| 2007/0157292 A1* | 7/2007 | Danner et al. ........... 726/4 |
| 2007/0199053 A1* | 8/2007 | Sandhu et al. ........... 726/4 |
| 2008/0072301 A1* | 3/2008 | Chia et al. .............. 726/8 |
| 2008/0104250 A1* | 5/2008 | Vanyukhin et al. ........ 709/226 |
| 2009/0172793 A1* | 7/2009 | Newstadt et al. ......... 726/6 |
| 2010/0064353 A1* | 3/2010 | Kan et al. .............. 726/5 |
| 2010/0263037 A1* | 10/2010 | Sirota .................. 726/8 |

OTHER PUBLICATIONS

Andreas Pashalidis and Chris J. Mitchell, "Single Sign-On Using Trusted Platforms", Mar. 23, 2003; http://citeseer.ist.psu.edu/cache/papers/cs/27162/http:zSzzSzwww.ma.rhul.ac.ukzSztechreportszSz2003zSzRHUL-MA-2003-3.pdf/pashalidis03single.pdf.

Liberty Alliance Project, "Cross Operation of Single Sign-On, Federation, and Identity Web Services Frameworks", 2006; http://projectliberty.org/liberty/content/download/867/6177/file/liberty-cross-framework-v1.0.pdf.

Rafae Bhatti, Elisa Bertino and Arif Ghafoor, "An Integrated Approach to Federated Identity and Privilege Management in Open Systems", Communications of the ACM, Feb. 2007/vol. 50, No. 2; http://delivery.acm.org/10.1145/1220000/1216025/p81-bhatti.pdf?key1=1216025&key2=2058306811&coll=GUIDE&dl=GUIDE&CFID=30481040&CFTOKEN=28993866.

\* cited by examiner

IDENTITY OWNERSHIP MIGRATION

BRIEF SUMMARY

Embodiments of the present invention relate to systems, computer-implemented methods, and computer-readable media for establishing an online account for an authenticated user with a resource provider. In a federated relationship, an authentication server authenticates a user to a resource provider so the user can utilize the resources of the resource provider. In aspects, the present invention allows an authenticated user to establish a direct authentication relationship or online account with the resource provider while maintaining the online account with the authentication provider. The user may confirm an existing account with the resource provider or may create a new account. Thus, if the online account of the user with the authentication provider is closed, the resource provider may still be able to a direct relationship with the user and the user will still have access to data maintained with the resource provider.

This Summary is provided to introduce a selection of concepts in a simplified that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

Embodiments of the present invention provide systems, computer-implemented methods, and computer-readable media for identity ownership migration. In one aspect, a computer-implemented method for establishing a direct authentication relationship between a user and a resource provider is provided. An authentication token including identification of a user is received by a resource provider. The authentication token may include a unique user identifier and other claims (e.g., user e-mail address) asserted by the authentication server. Based on the authentication token, the resource provider may determine whether the user is authorized to access the one or more services provided by the resource provide based on the unique identity carried in the authentication token. The resource provider may create a direct authentication relationship (such as an online account) with the user based on the information provided in the authentication token. Additional credentialing information, such as a password, may be requested from the user by the resource provider and stored.

In yet another embodiment, a computer-implemented method for associating an authenticated user and an existing account for a user with the resource provider is provided. An authentication token including identification of a user from an authentication server is received. It is requested whether the user has an existing online account with the resource provider. The existing account of the user is associated with the authenticated user. The association of the authenticated user and the existing account for the user is stored In yet another aspect, one or more computer readable media having computer-executable instructions embodied thereon that, when executed perform a method for creating an online account for a user with a resource provider are provided. At a resource provider, an authentication token including identification of a user from an authentication server is received. The authentication server and the resource provider each reside on a different service ecosystem. It is determined by the resource provider whether the user may access the one or more services provided by the resource provider based on the identification of the user carried in the authentication token. The data from the authentication token to establish an online account for the user with the resource provider and the online account for the user with the resource provider is stored.

Having briefly described an overview of embodiments of the present invention, an exemplary operating environment is described below.

Figure 1:
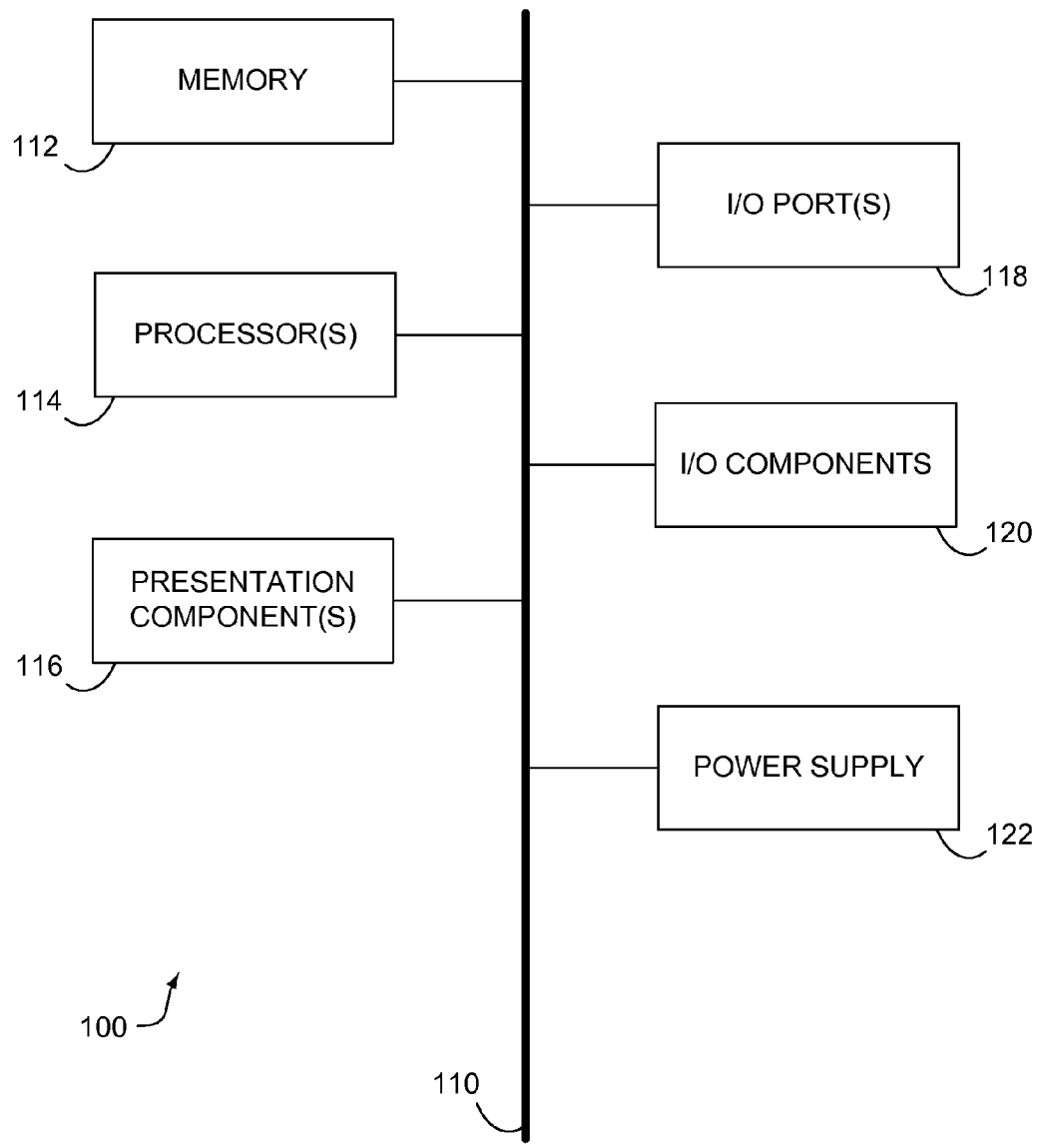
FIG. 1 is a block diagram of an exemplary computing environment suitable for use in implementing embodiments of the present invention.

Referring to the drawing figures in general and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
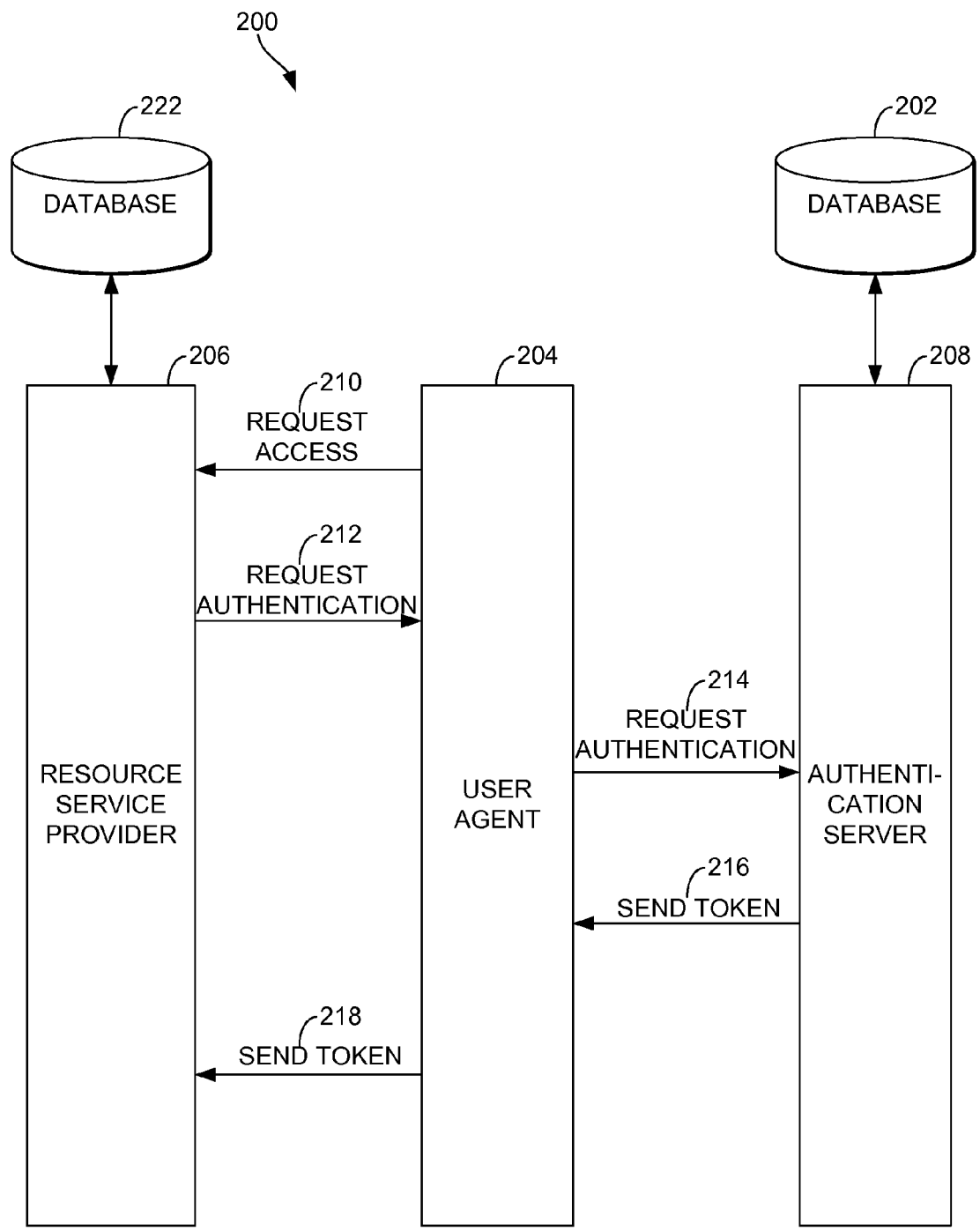
FIG. 2 is an exemplary federated environment for use in implementing embodiments of the present invention.

Turning now to FIG. 2, a block diagram is provided illustrating an exemplary environment 200 for migration of identity ownership, in accordance with an embodiment of the present invention. The environment 200 includes databases 202 and 222, a user agent 204, a resource provider 206, and an authentication server 208 in communication with one another. User agent 204, resource provider 206, and authentication server 208 may be in communication using a network that may include, without limitation, one or more local area networks (LANs) and/or wide area networks (WANs). Such networking environments are commonplace in offices, enterprise-wide computer networks and the Internet. Accordingly, specific features of the network are not further described herein.

Database 202 is configured to store information associated with user authentication. In various embodiments, without limitation, such information may include authentication information such as the identity and authentication for a user. For instance, the identity and authentication may be a username and a password for a user. In various embodiments, database 202 is configured to be searchable so that authentication server 208 may retrieve identity and authentication information for a user to confirm authentication of the user with an online service provider. Database 202 may be configurable and may include information relevant to authentication token validation. The content and/or volume of such information are not intended to limit the scope of embodiments of the present invention in any way. Further, although illustrated as a single, independent component, database 202 may, in fact, be a plurality of databases, for instance, a database cluster, portions of which may reside on a computing device associated with user agent 204, online service provider 206, authentication server 208, on another external computing device, or any combination thereof. Still further, although illustrated as independent from authentication server 208, in various embodiments, the entirety of database 202 may reside on a computing device associated with authentication server 208.

Before engaging in a discussion of the details of migration of identity ownership, an exemplary overview discussion of authentication tokens will be presented referencing FIG. 2 to help illustrate the overall functionality of environment 200 in various embodiments. Accordingly, in embodiments, where a user is accessing a network with user agent 204, such as a web browser, and where a user attempts to access an online service operated by an online service provider, such as resource provider 206, user agent 204 may send a request to resource provider 206. Examples discussed herein refer to a user attempting to access a single online resource and/or service offered by an online resource provider. By way of example, and not by limitation, exemplary online resources include, but are not limited to, e-mail, online social networks, online game resources, and a variety of other online resources.

Embodiments of the present invention, however, contemplate that a single access authentication may allow a user to visit various online services or utilize multiple online resources without requiring more than one authentication. For instance, a user may log into an online account and have access to more than one service, such as email and a social networking site, associated with the online resource provider. Thus, embodiments of the present invention are not limited to the exemplary embodiments discussing a single access point to a single service because it is contemplated that a single access point may be used for multiple online services.

Federated relationships allow for the authentication and authorization of data between security domains (e.g., between an authentication server 208 and a resource provider 206). Exemplary federation protocols include, but are not limited to, Security Assertion Markup Language (SAML) and Web Services (WS-) protocol. The authentication server 208 produces authentication tokens while the resource provider 206 utilizes the authentication tokens. In one embodiment, the authentication server 208 is a third-party server that has no relation to the server resource provider 206. For example, the authentication server 208 and the resource provider 206 may reside on different service ecosystems. A service ecosystem provides for authentication, payment and providing the resources. A federated relationship allows business entities to make assertions regarding the identity, attributes, and entitlements of a subject (an entity that is often a human user) to other entities, such as a partner company or another enterprise application.

The resource provider 206 relies on the authentication server 208 to identify the user. At the user's request, the authentication server 208 passes a federated authentication token or assertion to the resource provider 206. Based on this token, the resource provider 206 makes an access control decision.

Referring back to FIG. 2, and assuming that the online service requested by the user is email, an access request will be sent to the email provider as illustrated by numeral 210. As illustrated at numerals 212 and 214, in embodiments, the resource provider 206 (e.g., provider of e-mail, etc.) may not perform an authentication internally and may thus request authentication from authentication server 208. In one embodiment, the authentication is requested through user agent 204. In embodiments, the user may not recognize that the online resource provider has requested authentication through the user agent to an authentication server. For instance, where the user agent is a web browser, the user may just see a login screen to the user's email account. Having entered a username and password, the user may not recognize that the web browser is requesting authentication from an authentication server.

Alternatively, the resource provider 206 may directly request authentication from authentication server 208. The authentication server 208, upon receiving an authentication request, creates a token to send to the resource provider 206 confirming that the identification information entered by the user. For instance, the authentication server will confirm that the address and password entered by the user are associated and, if so, the authentication server 208 will create a token and send the token to the resource provider 206 (e.g., email provider) authenticating the user.

Figure 3:
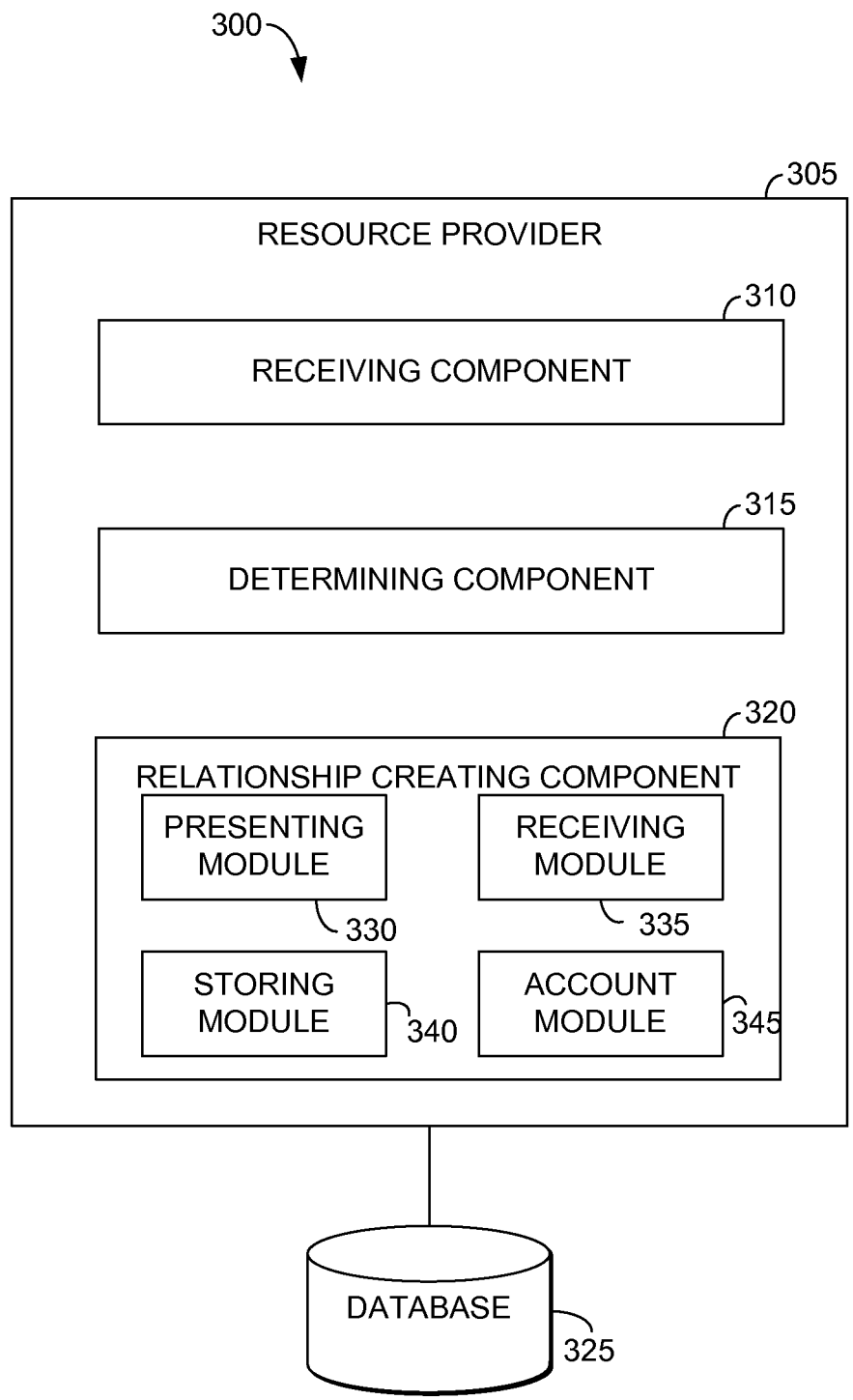
FIG. 3 is a block diagram of an exemplary computing system architecture suitable for use in implementing embodiments of the present invention.

In that regard, turning now to FIG. 3, a block diagram is provided illustrating an exemplary system 300 for identity ownership migration, in accordance with an embodiment of the present invention. Identity ownership migration allows a user to maintain their personal data and account information with one or more non-authentication service providers even if the relationship between the user and the authentication provider breaks down.

For example, a user with an online banking account with an authentication provider may utilize his or her online banking account to access online social networking services provided by a resource provider who is not associated with the authentication server. If the user switches to a different bank and the online account is closed, the user will lose all of the information associated with that online account. The user will also lose any information associated with the use of that account with the resource provider. As such, identity ownership migration allows a user in a federated relationship to create and maintain a direct online account with the resource provider so that if the online account with the authentication provider is closed or discontinued, the user will not lose all of their information and can continue to use the services The system 300 includes a resource provider 305 and a database 325. Database 325 is configured to store information associated identity ownership migration. In various embodiments, without limitation, such information may include authentication information such as the identity and credentials, such as a password, for a user. Database 325 may also contain information for additional identities or accounts for the user.

In various embodiments, database 325 is configured to be searchable so that resource provider 305 may retrieve identity and authentication information for a user. Database 325 may be configurable and may include information relevant to identity ownership migration. The content and/or volume of such information are not intended to limit the scope of embodiments of the present invention in any way. Further, although illustrated as a single, independent component, database 325 may, in fact, be a plurality of databases, for instance, a database cluster, portions of which may reside on resource provider 305, on another external computing device, or any combination thereof. Still further, although illustrated as independent from resource provider 305, in various embodiments, the entirety of database 325 may reside on a computing device associated with resource provider 305.

In embodiments, resource provider 305 has a federated relationship with an authentication provider for the authentication of a user between the resource provider 305 and the authentication server. The authentication server produces authentication tokens that are sent to resource provider 305. The resource provider 305 utilizes the authentication tokens to identify users. Based on the authentication token, the resource provider 305 makes access control decisions in determining whether to allow the user to utilize the resources of the resource provider 305.

Resource provider 305 includes a receiving component 310, a determining component 315, and a relationship creating component 320. Receiving component 310 is configured to receive an authentication token associated with a user from an authentication server (such as authentication server 208 of FIG. 2). In embodiments, the authentication token may include user identification. The authentication token indicates to the resource provider 305 authenticates the user. Stated differently, upon requesting and receiving an authentication token, a resource provider 305 may grant access to a user seeking admission into one or more online services/resources. In various embodiments, the authentication token is encoded with a time stamp, tamper-proofing mechanisms, and various other information provided by the authentication server.

Determining component 315 is configured to determine information regarding the user from the authentication token received from the authentication provider. For example, the determining component 315 may parse the authentication token received to determine user information (e.g., the determining component may determine a user e-mail address from the authentication token received from an authentication provider). This information may be utilized by the relationship creating component to create a direct relationship with the user associated with the authentication token. Some of the information that may be parsed from the authentication token includes an e-mail address for the user or password information.

Relationship creating component 320 is configured to create a relationship between the resource provider 305 and the user. The relationship creating component 320 includes a presenting module 330, a receiving module 335, a storing module 340 and account module 345. It will be appreciated the relationship creating component 320 of resource provider 305 is configured to create new direct relationship or account with the resource provider 305 for the user associated with the authentication token or receive confirmation from a user of the user's one or more existing relationships or accounts with the resource provider 305.

After creating a directly relationship or account for the user with the resource provider 305, credentials may be obtained from the user. Presenting module 330 of the resource provider 305 may displays an interactive graphical user interface or some for of input screen so that additional information, such as credentials, may be obtained from the user to be utilized for the direct account for the user with the resource provider 305. For example, when entering a service of the resource provider 305 after being authenticated by an authentication server, a user may be presented with an interactive graphical user interface to enter user information, such as credentials, for the account with the resource provider 305. In another embodiment, the user interface may be sent to a user via the user's e-mail address determined from the authentication token. Alternatively, a secure link or a link to an online form or graphical user interface and a temporary credential may be sent to the user via the user's e-mail to obtain credentialing information from the user. The receiving module 335 of the relationship creating component 320 receives the information input from a user and account module 345 associates the credentials with user's account with the resource provider 305.

Account module 345 creates a new direct trust relationship, such as a new online account, for the user associated with the authentication token received with the resource provider 305. Types of online accounts, but are not limited to, personal and group e-mail accounts, social networking accounts, gaming accounts, online payment account, merchant account, webpage accounts and the like. The online account created for the user may have associated credentials. The credentials may be any type of item that allows an identified user access to an account including, but not limited to, a typed pin number, an audio pin, a physical passkey, and a biometrics scan (fingerprint, face or eye scan). The information received from the user and the new account and associated pass code for the user is stored in storing module 340.

In another embodiment, a user may confirm one or more existing direct trust relationship, such as an existing online account, with the resource provider 305 through identity linking. Presenting module 330 of the resource provider 305 provides or displays an interactive graphical user interface to the user associated with the authentication token so that a user may provide information regarding an existing account with the resource provider. For example, when entering a service of the resource provider 305, a user may be presented with an interactive graphical user interface to enter information for an existing online account with the resource provider 305. For example, the user may enter the login identification and pass code for the existing account to verify that the user has an existing account.

In another embodiment, the user interface may be sent to the user's e-mail addressed determined from the authentication token received by the resource provider. The information regarding the existing account may be entered and sent to the resource provider 305. The receiving module 335 of the relationship creating component 320 receives the information input from a user and account module 345 links or associates the existing account for the resource provider to the user identified in the authentication token. For example, if the user was being authenticated to a social networking resource provider for an online banking account, the account module 345 may link the online banking account for which the authentication token was received by the resource provider to the user's existing social networking account (e.g., SNARF or MYSPACE). The information received from the user and the associating of user accounts is stored in storing module 340. Once the user's accounts have been associated or linked, in embodiments, when the user logs on to either account in the future, the user may be able to access information for both accounts as they have been associated.

Figure 4:
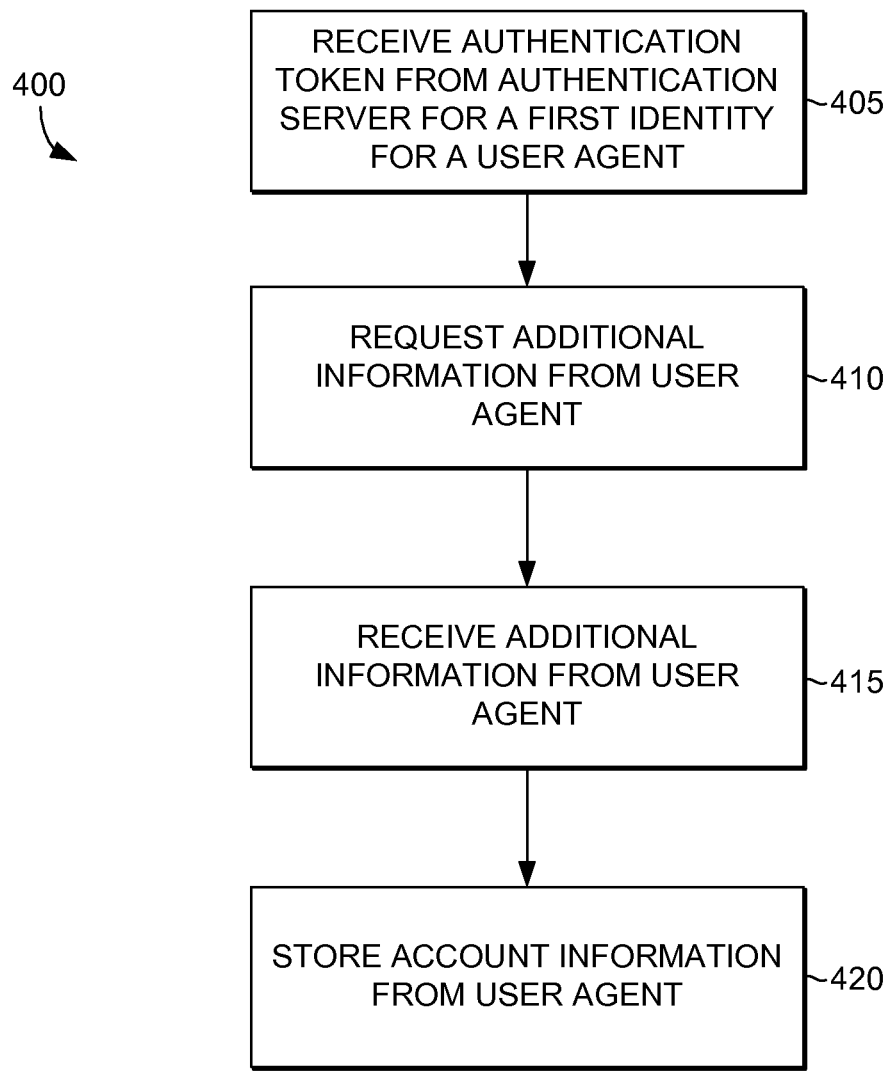
FIG. 4 is a flow diagram illustrating method for creating a new online account for the user with the resource provider in accordance with an embodiment of the present invention.

Referring next to FIG. 4, a computer-implemented method 400 for creating a new online account for a user with a resource provider is provided. At step 405, an authentication token for identifying and authenticating a user from an authentication server is received by a resource provider and an account for the user with the resource provider is created. At step 410, additional information may be requested from a user. By way of example, the credentials may be request from the user at the time the user accesses a resource or service of the resource provider by displaying a graphical user interface for the user to enter user identification information. In another embodiment, the request for additional information (e.g., interactive graphical user interface) from the user may be sent to a user's e-mail address determined from the authentication token or other online account to obtain the credentials. The user's e-mail address or other online account address may be parsed from the authentication token received by the resource provider from an authentication server. In another embodiment, federated account may be later converted to an account with the resource provider by virtue of this linkage.

At step 415, the additional information from the user is received by the resource provider. In one embodiment, exemplary information that may be received may include credentials for the online account with the resource provider. In another embodiment, the information may be the identification and verification of an existing online account with the resource provider for the user associated with the authentication token received. At step 420, the credentials received from the user are stored in a database for the user's account with the resource provider.

Figure 5A:
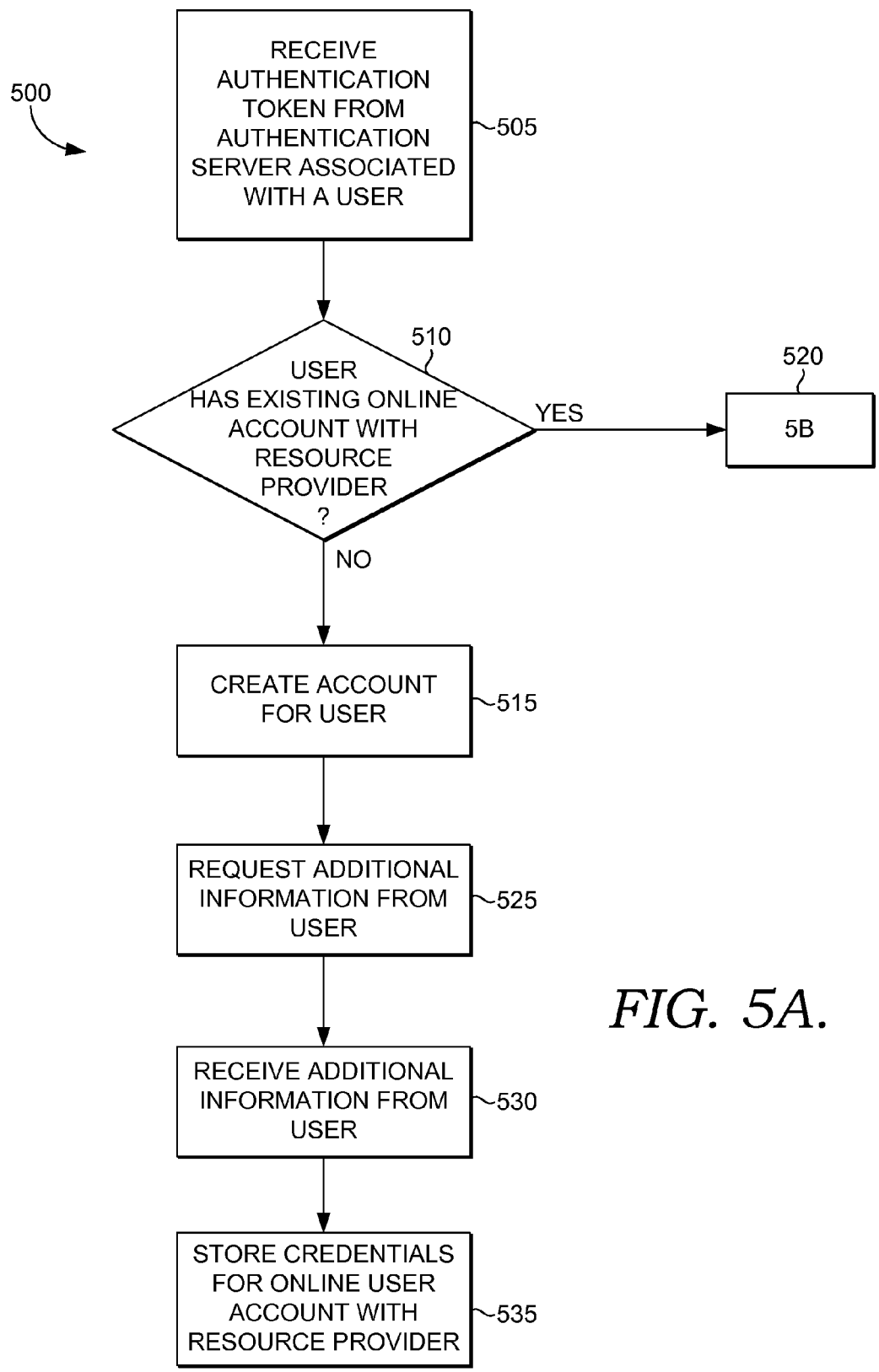
FIG. 5A is a flow diagram illustrating a method for determining whether a user associated with an authentication token has an existing online account with a resource provider.

Referring next to FIG. 5A, a computer-implemented method 500 for determining whether a user has an existing online account with a resource provider is provided. At step 505, an authentication token authenticating a user to a resource provider is received from an authentication server. At step 515, it is determined whether that user has an existing online account with the resource provider. For example, the user is prompted with an electronic message requesting whether they have an existing online account. If at step 515, it is determined that the user does not have an existing online account with resource provider, then at step 510, a direct authentication relationship such as account for the user agent associated with the authentication token received is created with the resource provider. At step 525 the user is prompted for additional credentialing information for the new online account with the resource provider.

Figure 5B:
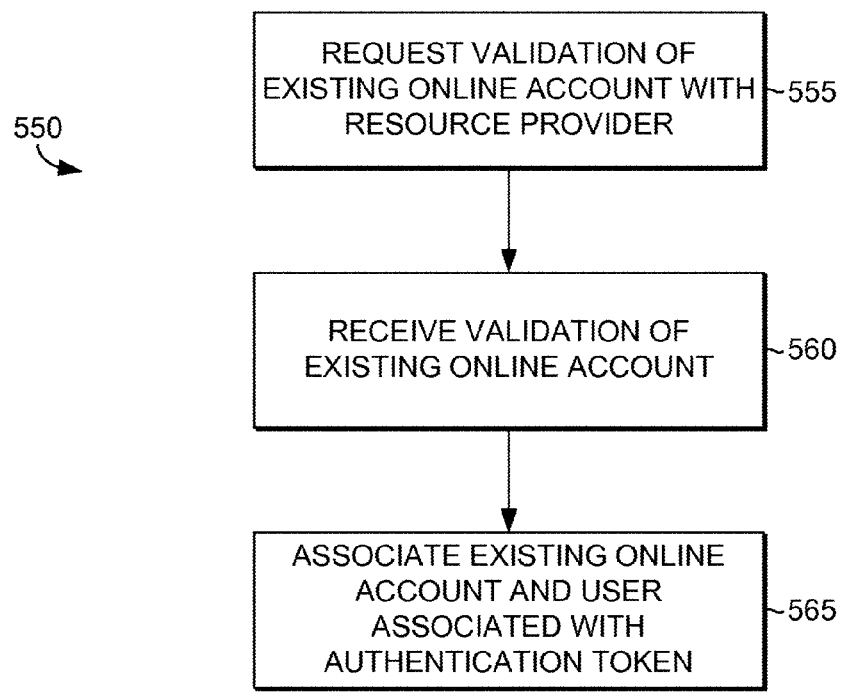
FIG. 5B is a flow diagram illustrating a method for associating a user associated with an authentication token and an existing online account for the user with the resource provider.

At step 530, the additional information is received from the user and at step 535 the additional information is for the online account is created for the user with the resource provider. If at step 515, it is determined that the user has an existing online account with the resource provider (e.g., user states that he/she has an existing account) at step 555 of FIG. 5B, validation of the existing online account with the resource is requested. By way of example, the user may validate an online existing account with the resource provider by entering an appropriate login identification and pass code or by providing an appropriate login identification and answering a secret question with the correct stored answered. At step 560, the validation information of the existing online account with the resource provider is received and the user associated with the authentication token received and the existing online account for the user are linked or somehow associated with one another.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. A computer-implemented method for establishing a direct authentication relationship between a user and a resource provider, the method comprising:
   receiving an authentication token including identification of a user from an authentication server, such that the resource provider has requested authentication from the authentication server through a user agent;
   utilizing data from the authentication token to establish a direct authentication relationship between the user and the resource provider;
   storing the direct authentication relationship between the user and the resource provider;
   discontinuing a relationship between the authentication server and the user;
   maintaining the direct authentication relationship between the user and the resource provider utilizing the stored direct authentication relationship; and
   allowing the user to continue to access one or more services of the resource provider while the relationship between the authentication server and the user remains discontinued.

2. The method of claim 1, further comprising:
   requesting credentialing information from the user for the direct authentication relationship.

3. The method of claim 1, wherein the direct authentication relationship between the user and the resource provider is an online account of the user with the resource provider.

4. The method of claim 3, wherein the authentication server and the resource provider exist in a federated relationship.

5. The method of claim 4, wherein the authentication server and the resource provider reside on different service ecosystems.

6. The method of claim 1, wherein requesting additional information from the user comprises displaying a graphical user interface to the user for the entry of the user information when the user accesses one or more resources of the resource provider.

7. The method of claim 6, wherein the electronic mail account of the user is parsed from the authentication token received from the authentication provider.

8. The method of claim 1, wherein requesting additional information from the user comprises communicating a graphical user interface to the user for the entry of user information to an electronic mail account of the user.

9. The method of claim 1, wherein the direct authentication relationship between the user and the resource provider is established by confirming an already existing relationship between the user and the resource provider.

10. The method of claim 1, wherein the direct authentication relationship is established by creating a new account for the user with the resource provider.

11. A computer-implemented method for associating an authenticated user and an existing account for a user with a resource provider, the method comprising:
    receiving an authentication token including identification of a user from an authentication server, such that the resource provider has requested authentication from the authentication server through a user agent;
    requesting from the user whether the user has an existing online account with the resource provider;
    associating the existing account of the user with the authenticated user;
    storing the association of the authenticated user and the existing account for the user
    discontinuing a relationship between the authentication server and the user;
    maintaining the existing account for the user utilizing the stored direct authentication relationship between the user and the resource provider; and
    allowing the user to continue to access one or more services of the resource provider while the relationship between the authentication server and the user remains discontinued.

12. The method of claim 11, wherein the authentication token is for authenticating a user with the resource provider.

13. The method of claim 11, further comprising:
    requesting additional credentialing information from the user comprising displaying a graphical user interface to the user for the entry of the user information when the user accesses one or more resources of the resource provider.

14. The method of claim 13, further comprising:
    requesting additional credentialing information from the user comprising communicating a graphical user interface to the user for the entry of user information to an electronic mail account of the user.

15. The method of claim 14, wherein the electronic mail account of the user is parsed from the authentication token received from the authentication provider.

16. The method of claim 11, wherein the authentication server and the resource provider exist in a federated relationship.

17. The method of claim 16, wherein the authentication server and the resource provider reside on different service ecosystems.

18. The method of claim 17, wherein the association of the authenticated user and the existing account for the user is stored such that the user can access an authenticated account and the existing account with the service provider at the same time.

19. One or more computer storage device having computer-executable instructions embodied thereon that, when executed perform a method for creating an online account for a user with a resource provider, the method comprising:
    receiving at a resource provider an authentication token including identification of a user from an authentication server, the authentication server and the resource provider each residing on a different service ecosystem, such that the resource provider has requested authentication from the authentication server through a user agent;
    determining whether the user may access the one or more services provided by the resource provider based on the identification of the user carried in the authentication token;
    utilizing data from the authentication token to establish an online account for the user with the resource provider; and
    storing the online account for the user with the resource provider
    discontinuing a relationship between the authentication server and the user;
    maintaining the online account for the user utilizing the stored online account; and
    allowing the user to continue to access one or more services of the resource provider while the relationship between the authentication server and the user remains discontinued.

20. The device of claim 19, further comprising:
requesting additional credentialing information from the user, the credentialing information comprising a password; and
storing the credentialing information and online account for the user with the resource provider.

* * * * *